United States Patent
Chen

(10) Patent No.: US 6,332,242 B1
(45) Date of Patent: Dec. 25, 2001

(54) ROTATIONAL HANDGRIP

(75) Inventor: Pen-I Chen, Panchiao (TW)

(73) Assignee: Chaw Khong Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 09/598,025

(22) Filed: Jun. 21, 2000

(51) Int. Cl.[7] ............... B62B 7/00; A45C 3/00
(52) U.S. Cl. ............ 16/113.1; 16/900; 16/429; 16/408; 280/655; 280/655.1; 280/47.371; 403/95
(58) Field of Search ............... 16/334, 331, 332, 16/900, 113.1, 429, 408; 280/47.371, 655.1, 655; 403/94, 95, 96

(56) References Cited

U.S. PATENT DOCUMENTS

| | | | |
|---|---|---|---|
| 1,180,669 | * 4/1916 | Oellrich et al. | 16/334 |
| 4,114,235 | * 9/1978 | Remington | 16/321 |
| 4,577,877 | * 3/1986 | Kassai | 16/113.1 |
| 4,881,776 | * 11/1989 | Wang | 403/96 |
| 5,330,037 | * 7/1994 | Wang | 190/18 A |
| 5,547,053 | * 8/1996 | Liang | 16/113.1 |
| 5,647,095 | * 7/1997 | Takimoto | 16/405 |
| 5,713,441 | * 2/1998 | Chen | 16/113.1 |

* cited by examiner

Primary Examiner—Chuck Y. Mah
(74) Attorney, Agent, or Firm—Rosenberg, Klein & Lee

(57) ABSTRACT

A rotational handgrip for baggage trailer comprises a main body having two hollow pipes on both sides thereof and two link connectors. The hollow pipes have receiving holes each housing a clamping bead, and the bead can be pushed outward. The two link connectors each has a plurality of clamping hole; and the two hollow pipes are pivotally arranged on the two link connectors such that the main body can be rotationally adjusted and the bead can be moved outward and fixed on the clamping hole to clamp the main body.

3 Claims, 10 Drawing Sheets

A-A

B-B

ROTATIONAL HANDGRIP

FIELD OF THE INVENTION

The present invention relates to a rotational handgrip, especially to a rotational handgrip, which can be adjusted to various degrees for easy use.

BACKGROUND OF THE INVENTION

The conventional baggage trailer 11a with wheel 10a is generally has telescopic link 12a with a handgrips 13a. The telescopic link 12a can be shrunk or extracted and the user pushes or pulls the baggage trailer 11a on the handgrips 13a.

However, the angle of the handgrips 13a in the conventional baggage trailer 11a with wheel 10a cannot be adjusted. The handgrips 13a is parallel with the telescopic link 12a such that the baggage trailer 11a has small inclining angle with respect to ground. The user should exert larger force to push or pull the baggage trailer 11a.

Moreover, by using the handgrips 13a, the user may be stumbled by the baggage trailer 11a.

It is the object of the invention to provide a rotational handgrip for baggage trailer, which can be adjusted to various degrees for easy use and not stumbling user.

To achieve above object, the present invention provides a rotational handgrip for baggage trailer comprising a main body having two hollow pipes on both sides thereof and two link connectors. The hollow pipes have receiving holes each housing a clamping bead, and the bead can be pushed outward. The two link connectors each has a plurality of clamping hole; and the two hollow pipes are pivotally arranged on the two link connectors such that the main body can be rotationally adjusted and the bead can be moved outward and fixed on the clamping hole to clamp the main body.

The various objects and advantages of the present invention will be more readily understood from the following detailed description when read in conjunction with the appended drawing, in which:

DETAILED DESCRIPTION OF THE PREFERRED EMBODIMENT

Figure 1:
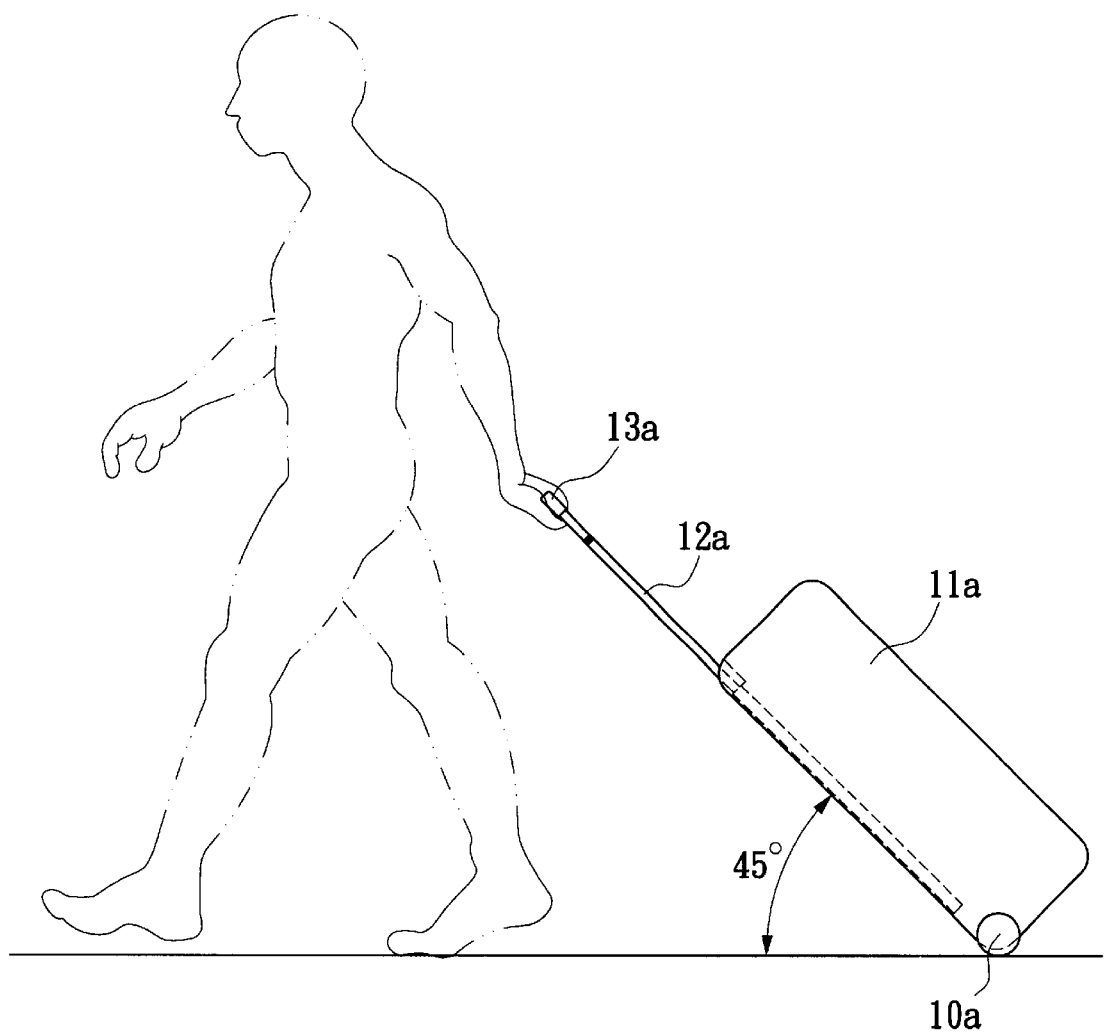
FIG. 1 is a sectional view of the prior art baggage trailer.
Figure 2:
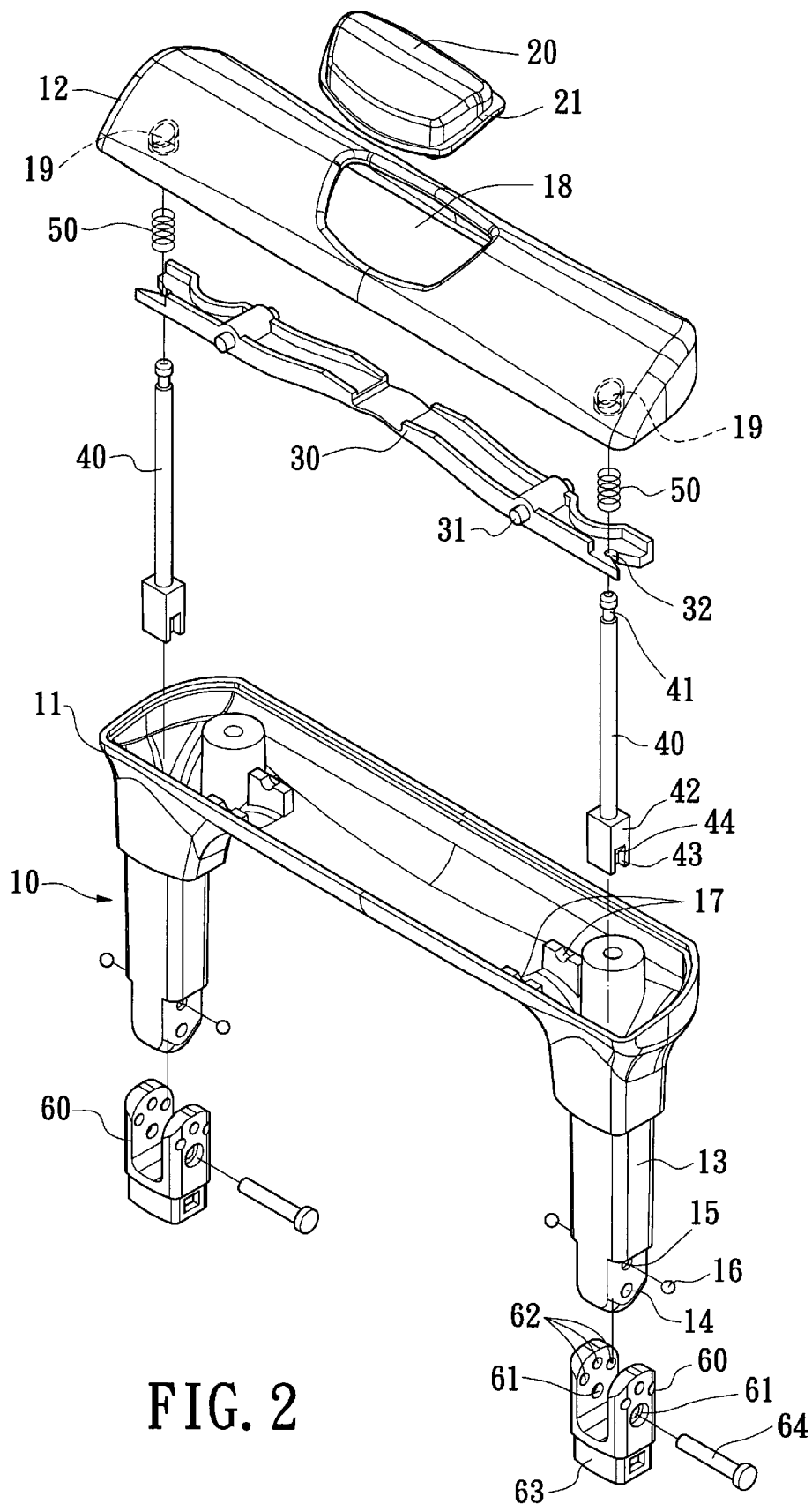
FIG. 2 is an exploded view of the present invention.
Figure 3:
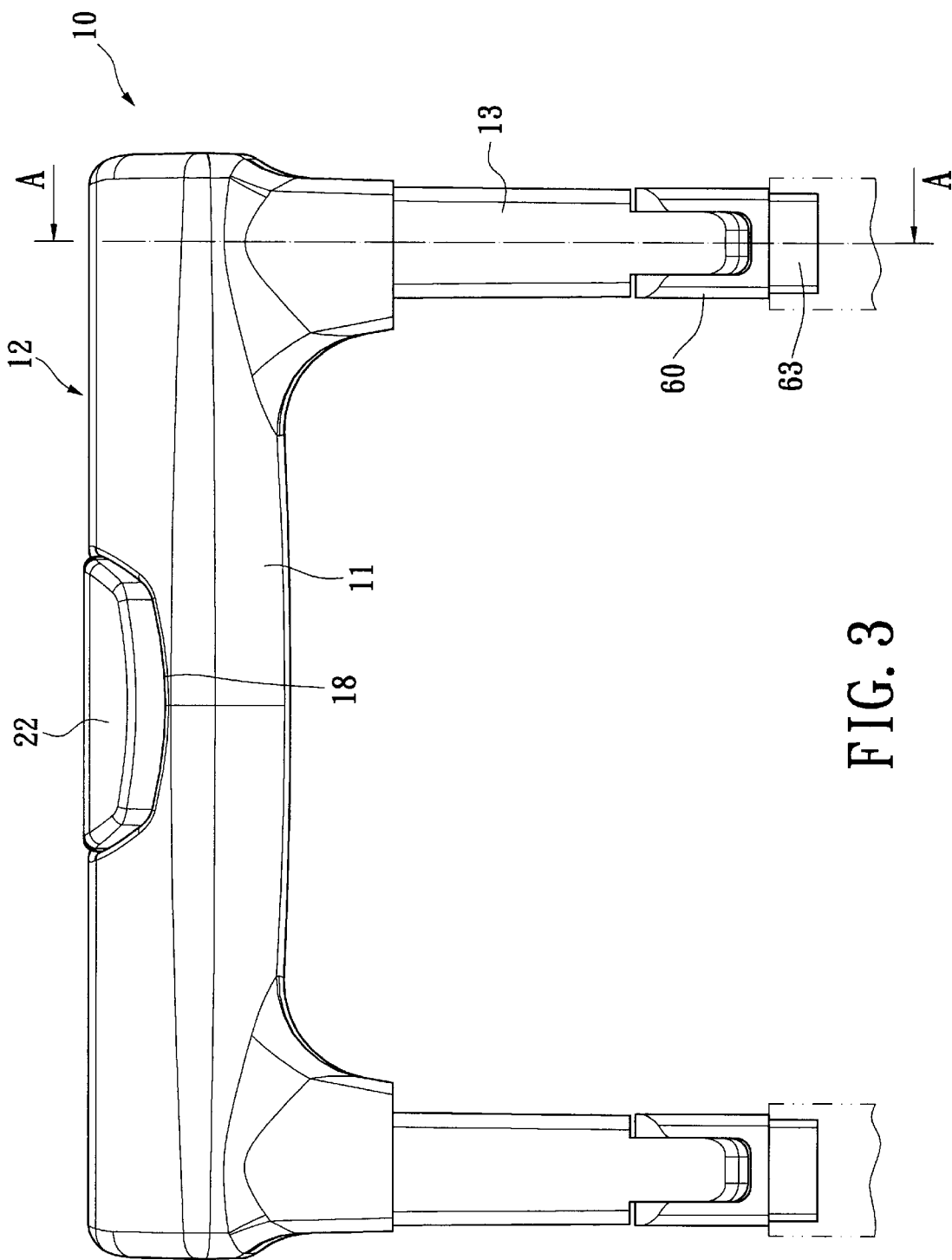
FIG. 3 is a front side view of the present invention.
Figure 4:
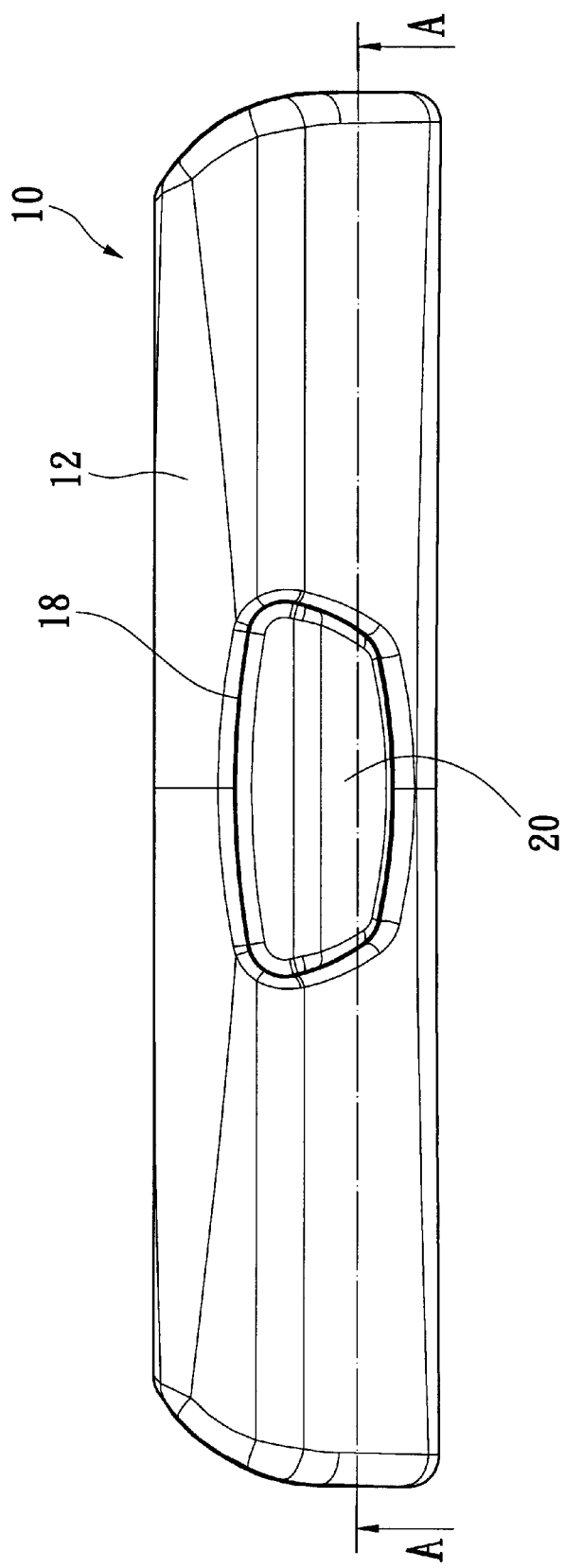
FIG. 4 is a topside view of the present invention.
Figure 5:
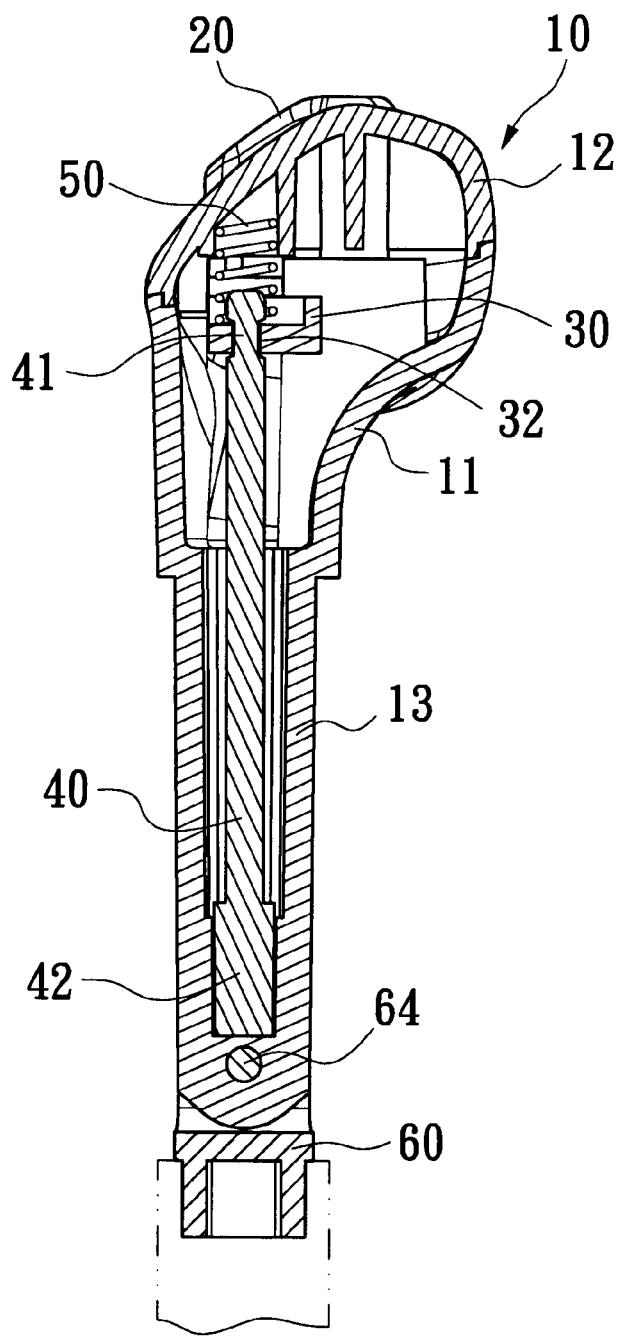
FIG. 5 is a sectional view along line A—A in FIG. 3.
Figure 6:
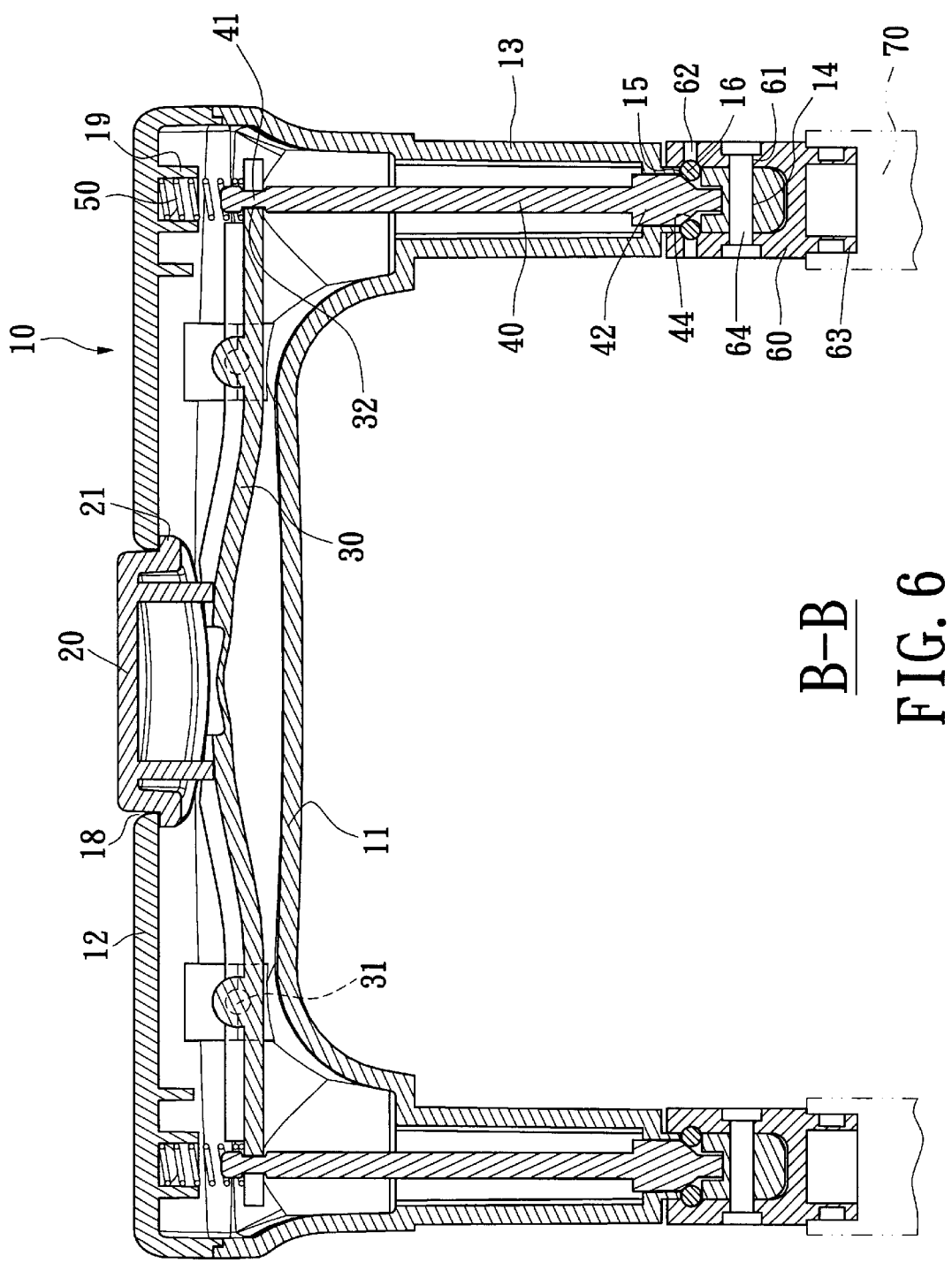
FIG. 6 is a sectional view along line B—B in FIG. 3.

FIG. 2 shows an exploded view of rotational handgrip for baggage trailer according to the present invention. The rotational handgrip is arranged on a telescopic link of the baggage trailer and comprises a main body 10, a push button 20, a first connection rod 30, two second connection rods 40, two elastic elements 50 and two link connectors 60. The main body 10 comprises a lower handgrip 11 and an upper handgrip 12. With reference to FIGS. 3 to 6, the lower handgrip 11 is a hollow shell with opened top end and two hollow pipes 13 extended downward from both sides thereof. The hollow pipes 13 have pivotal holes 14 in the horizontal direction. The pivotal holes 14 have receiving holes 15 on top side thereof and the receiving holes 15 contain a clamping bead 16. The lower handgrip 11 has two bearing stages 17 on two inner lateral sides thereof. The upper handgrip 12 is a hollow shell with opened bottom end. The upper handgrip 12 has two fixing stages 19 with elastic element on two inner lateral sides thereof. After the first connection rod 30, two second connection rods 40, and two elastic elements 50 are assembled into the upper and lower handgrips 12 and 11, the upper and lower handgrips 12 and 11 can be joined by screw or supersonic wave processing, thus forming the main body 10.

The push button 20 is arranged in an aperture 18 of the main body 10 and exposed out of the main body 10 with a predetermined height. The push button 20 has retaining flange 21 on lateral side to prevent the push button 20 from dropping out of the aperture 18.

The first connection rod 30 has a predetermined length and made of elastic materials. The first connection rod 30 has hogged center side and has two pivotal shafts 31 on both sides thereof and two locking grooves 32 on both sides thereof. The first connection rod 30 is horizontally arranged within the main body 10 and the pivotal shafts 31 thereof are mounted on the bearing stages 17. The two locking grooves 32 are arranged on the two hollow pipes 13.

The second connection rods 40 have a predetermined length and each has a locking end 41 on topside thereof and a larger pushing part 42 on bottom side thereof. The pushing part 42 has dents 43 on both sides thereof and pushing surface 44 of 0–40 degree within the dents 43. If the pushing surface 44 is 0 degree, the clamping effect is better. If the pushing surface 44 is inclined larger than 0 degree, the driving force to the clamping bead 16 is smaller but the hollow pipes 13 are protected. If the load is excessive, the pushing surface 44 will be detached. The second connection rods 40 are vertically arranged within the two hollow pipes 13 and the locking end 41 of the second connection rods 40 are locked on the two locking grooves 32 on both sides of the first connection rod 30 such that the upper ends of the two second connection rods 40 are connected to both sides of the first connection rod 30 and the pushing surface 44 touched inner side of the bead 16. When the two second connection rods 40 are moved downward, the pushing surface 44 is driven to push the bead 16 outward.

The elastic elements 50 are compressed springs and arranged within the main body 10 and at top of the first connection rod 30. The upper ends of the second connection rods 40 are locked to the two fixing stages 19 and the lower ends of the second connection rods 40 are abutted to both sides of the first connection rod 30. The two elastic elements 50 push the both ends of the first connection rod 30 to move downward such that the second connection rods 40 are moved downward. The second connection rods 40 driver the pushing surface 44 to push the bead 16 outward, and the outer perimeter of the bead 16 exposes out of the receiving holes 15.

Figure 7:
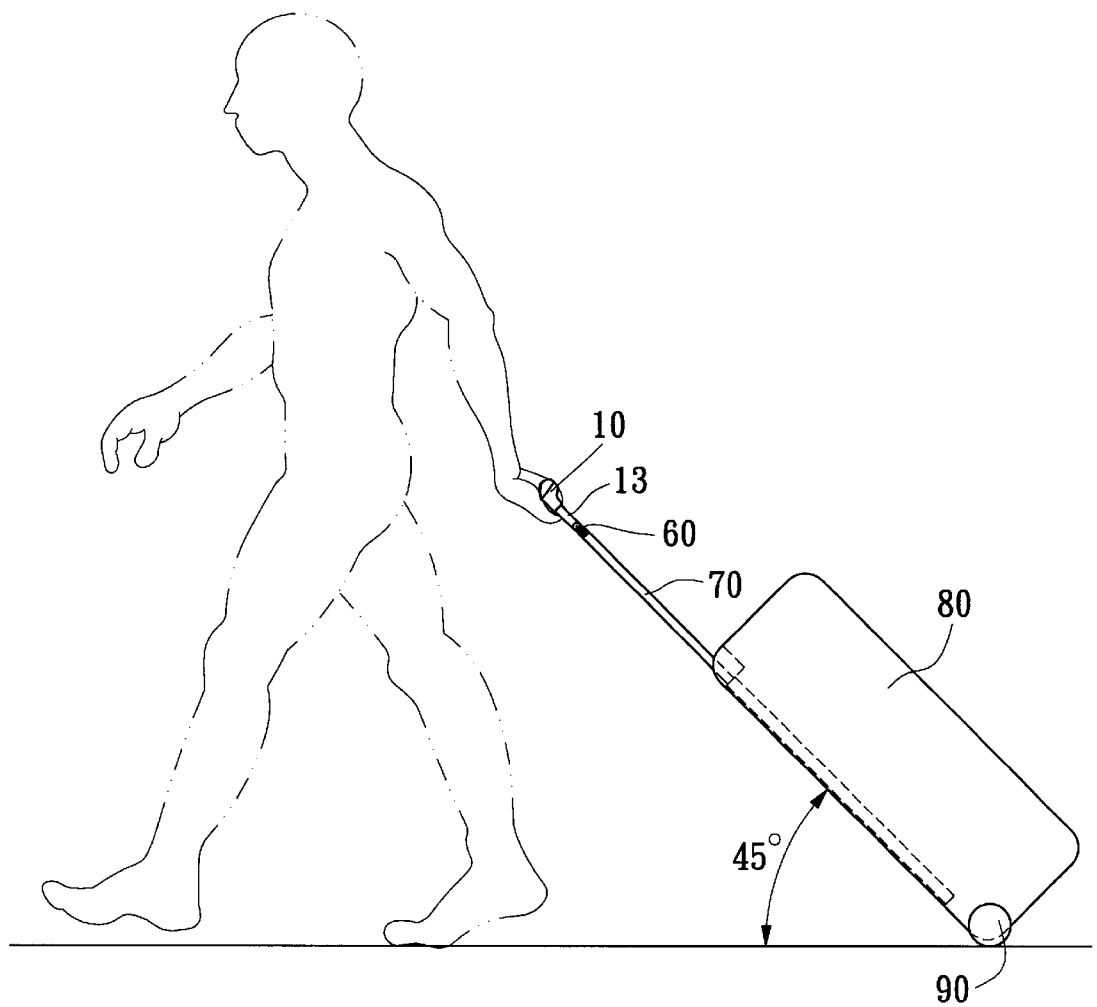
FIG. 7 is a planar view showing the present invention applied in a baggage trailer.
Figure 8:
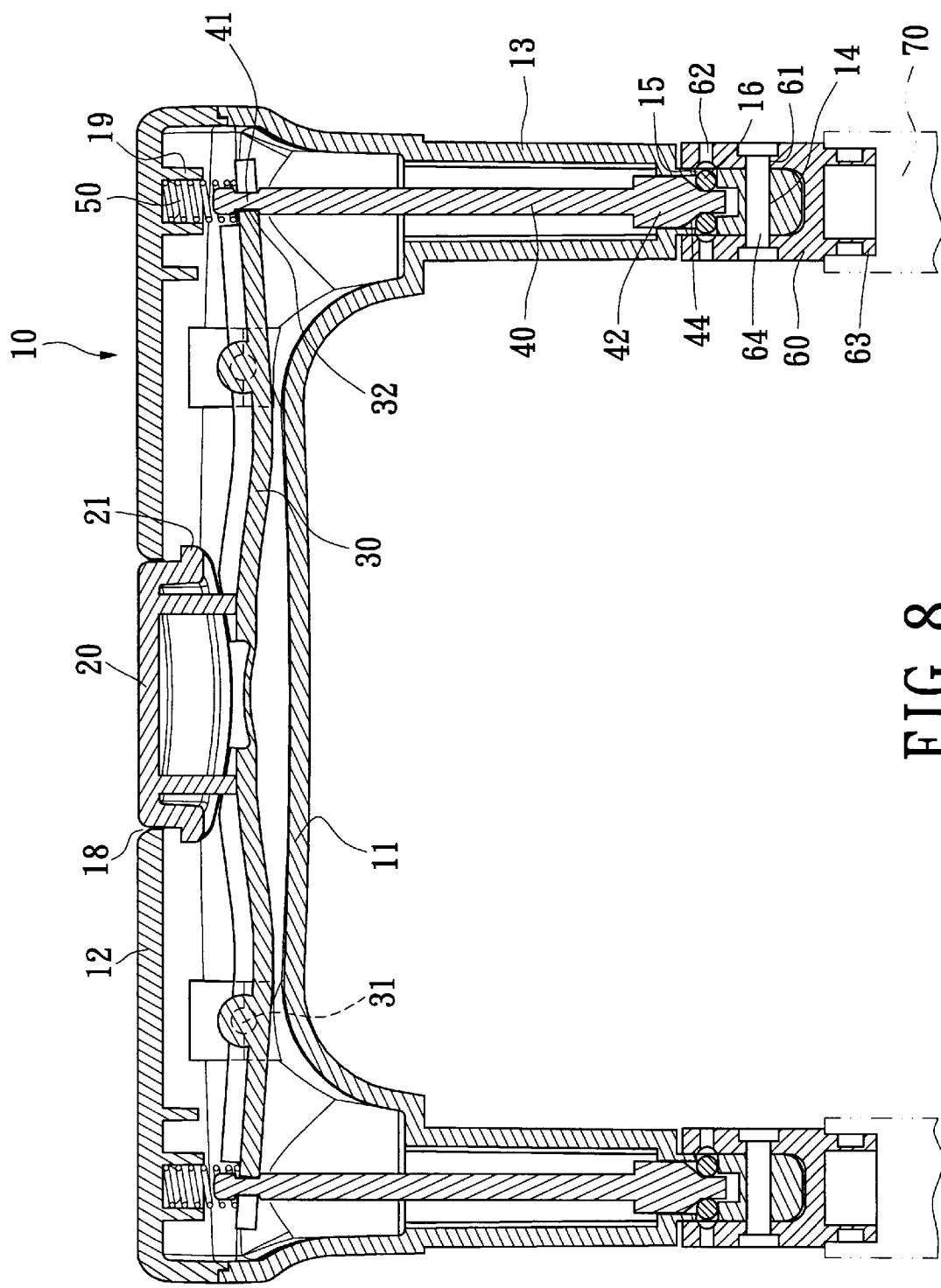
FIG. 8 is a sectional view showing adjustment of the present invention.

The link connectors 60 are arranged on bottom side of the hollow pipes 13 and are of U-shape with pivotal holes 61 on both sides thereof. The link connectors 60 have a plurality of clamping holes 62 on both inner walls thereof and sockets 63 on bottom thereof. As shown in FIGS. 7 and 8, the link connectors 60 are connected to top of the link 70 through the sockets 63. Two pivotal rods 64 pass through the pivotal holes 61 of the link connectors 60 and the pivotal holes 14 of the below the hollow pipes 13 such that the main body 10 is rotated with respect to the pivotal rods 64. Moreover, at ordinary time, the two elastic elements 50 push the both ends of the first connection rod 30 to move downward such that the second connection rods 40 are moved downward. The second connection rods 40 driver the pushing surface 44 to push the bead 16 outward, and the outer perimeter of the bead 16 exposes out of the receiving holes 15 and is locked to the clamping hole 62. Therefore, the handgrip is clamped.

As shown in FIG. 7, the rotational handgrip according to the present invention can be applied to the telescopic link 70 of the baggage trailer 80 with wheel 90. The rotational handgrip according to the present invention is arranged on top of the telescopic link 70. By the rotational handgrip, the telescopic link 70 can be shrunk or extracted and the baggage trailer 80 can be pushed or pulled.

As shown in FIG. 8, when user pushes the push button 20, the center of the first connection rod 30 moves upward and both ends of the first connection rod 30 move upward such that the second connection rods 40 are moved upward. The pushing surface 44 does not push the bead 16 outward and the bead 16 is not locked in the clamping hole 62. The main body 10 can be swung with respect to the pivotal rods 64. After the push button 20 is released, the two elastic elements 50 push the both ends of the first connection rod 30 to move downward such that the second connection rods 40 are moved downward. The second connection rods 40 driver the pushing surface 44 to push the bead 16 outward, and the outer perimeter of the bead 16 exposes out of the receiving holes 15 and is locked to the clamping hole 62.

Figure 9:
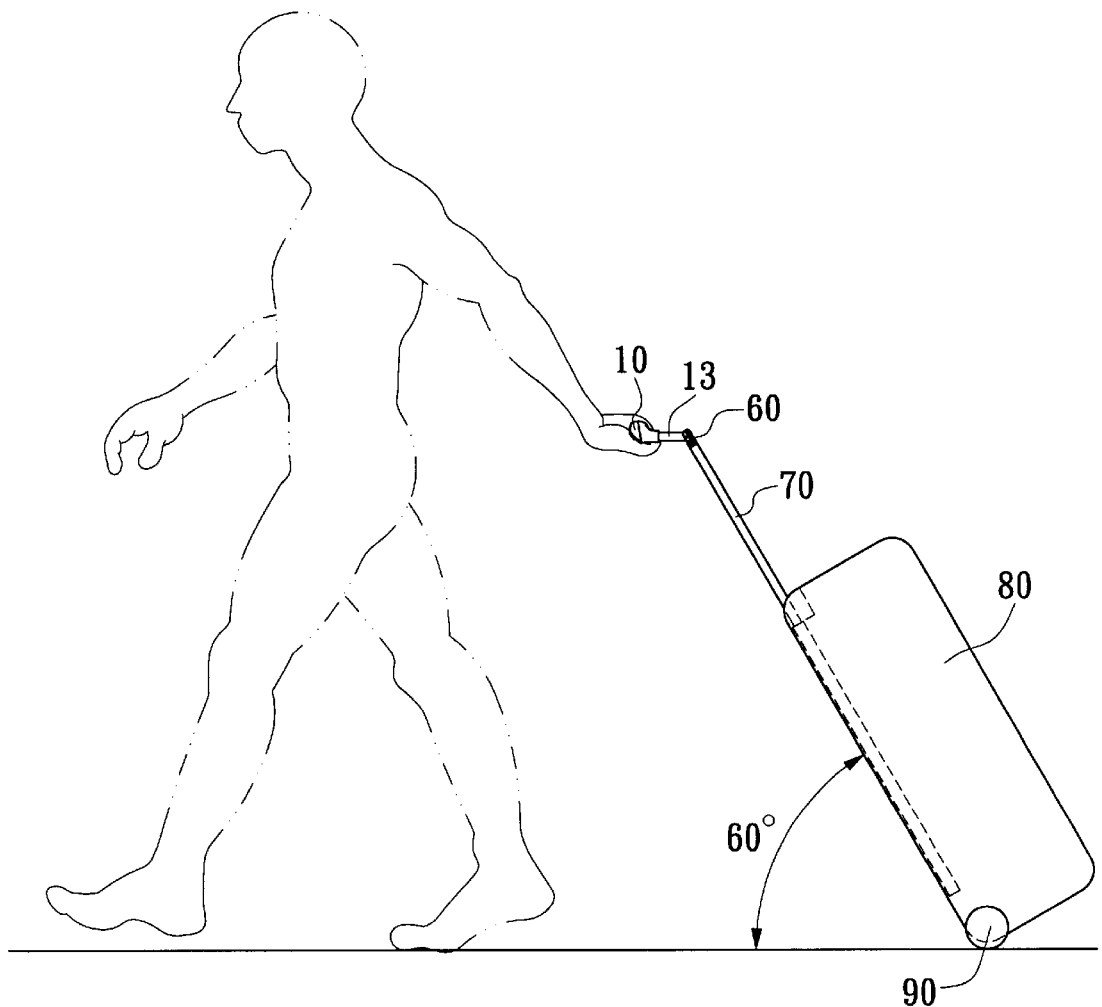
FIG. 9 is another planar view showing the present invention applied in a baggage trailer.
Figure 10:
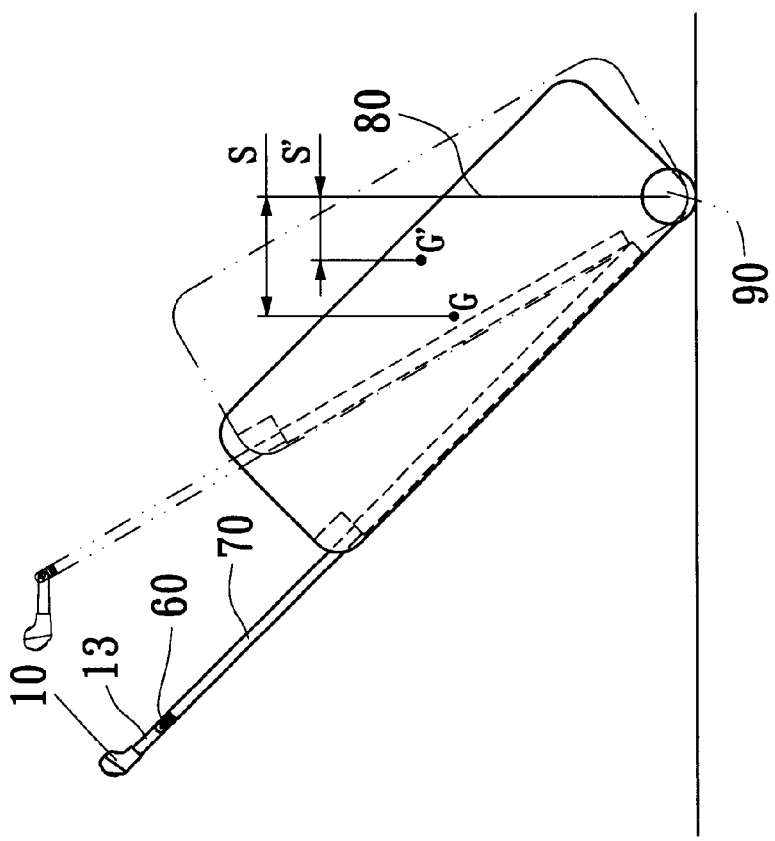
FIG. 10 is a planar view showing the change of gravity of the baggage trailer in the present invention.

As shown in FIG. 9, the user can adjust the angle between the main body 10 and the link 70. For example, the angle between the main body 10 and the link 70 can be adjusted to 120 degree such that the main body 10 is nearly horizontal and the trailer 80 has larger angle with respect to ground. As shown in FIG. 10, the center of gravity of the trailer 80 becomes G' in stead of G, the distance between the center of gravity of the trailer 80 and the vertical line passing through the wheel 90 becomes S' instead of S. The trailer 80 can be easier to push or pull.

As shown in FIG. 9, when the main body is adjusted to a horizontal stage, the user becomes less possible to be stumbled.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A rotational handgrip comprising:

a main body having two hollow pipes respectively extending from opposing ends of the main body, each of the hollow pipes having at least one receiving hole formed in a distal end thereof and housing a bead, the bead can being outwardly displaceable to at least partially extend from said receiving hole;

two link connectors each having a plurality of clamping holes formed therein, each of the two link connectors being pivotally coupled to a respective one of the hollow pipes such that the main body can be rotationally adjusted and the bead moved outwardly to engage a respective clamping hole and rotationally fix the main body;

a push button disposed in an aperture formed in the main body;

a first connection rod arranged within the main body and having two pivotal shafts adjacent opposing ends thereof, each of the two pivotal shafts being disposed on a respective one of two bearing stages respectively formed on two inner lateral sides of the main body; and, a pair of second connection rods each having a pushing part on a lower end thereof with at least one pushing surface, each of the two second connection rods being arranged within a respective one of the two hollow pipes, each of the second connection rods having an upper end connected to a respective end of the first connection rod, the pushing surface of each of the second connection rods being disposed in abutting relationship with a respective bead;

wherein when the two second connection rods are moved downwardly, the pushing surfaces thereof respectively push the beads to move outwardly.

2. The rotational handgrip as in claim 1, wherein each of the pushing parts of the second connection rods has a dent and the corresponding pushing surface of a respective second connection rod is formed in the dent.

3. The rotational handgrip as in claim 1, wherein each pushing surface is inclined at an angle within a range of 0–40 degrees.

* * * * *